March 5, 1957  H. R. KAISER ET AL  2,784,396
HIGH-SPEED ELECTRONIC ANALOGUE-TO-DIGITAL CONVERTER SYSTEM
Filed April 2, 1953  3 Sheets-Sheet 1

INVENTORS.
HAROLD R. KAISER,
CLAUDE A. LANE,
BY WILFORD S. SHOCKENCY,
Seymour M. Rosenburg

ATTORNEY.

INVENTOR.
HAROLD R. KAISER,
CLAUDE A. LANE,
BY WILFORD S. SHOCKENCY,
SEYMOUR M. ROSENBERG

ATTORNEY.

March 5, 1957

H. R. KAISER ET AL 2,784,396

HIGH-SPEED ELECTRONIC ANALOGUE-TO-DIGITAL CONVERTER SYSTEM

Filed April 2, 1953

INVENTOR.
HAROLD R. KAISER,
CLAUDE A. LANE,
BY WILFORD S. SHOCKENCY,
Seymour M. Rosenberg
ATTORNEY.

United States Patent Office 2,784,396
Patented Mar. 5, 1957

2,784,396

HIGH-SPEED ELECTRONIC ANALOGUE-TO-DIGITAL CONVERTER SYSTEM

Harold R. Kaiser, Woodland Hills, Claude A. Lane, Culver City, and Wilford S. Shockency, Torrance, Calif., assignors, by mesne assignments, to Hughes Aircraft Company, a corporation of Delaware Application April 2, 1953, Serial No. 346,392

9 Claims. (Cl. 340—347)

The present invention relates to analogue-to-digital converter systems and more particularly to a high-speed electronic analogue-to-digital converter system for converting a plurality of analogue input signals to corresponding sets of digital output signals, the conversion being performed by forming one binary digit signal of the desired digital set at a time.

An analogue-to-digital converter is a device which accepts instantaneous values of variable quantities and expresses these values in discrete numerical form. In general, an electronic converter of this type periodically samples the instantaneous amplitude of an analogue input signal and expresses the amplitude of the sample in the form of a set of digital signals or a count.

Four general types of electronic analogue-to-digital converter systems have been utilized in the prior art. In one type of converter system a sample of voltage representing the analogue data to be converted is first introduced into a sampling pulse-width modulator which measures the amplitude of the voltage sample with respect to a bias voltage and gates out a pulse having a width proportional to the measured amplitude. This gate pulse controls a gate which is coupled between a clock-pulse source and a pulse counter, the control being in such a manner that the number of clock pulses passed to the counter is substantially proportional to the width of the gate pulse. The clock pulse rate is determined by the maximum number of digits to be represented. For example, if the analogue data are to be represented by four binary digits, the clock pulse rate is set so that the maximum width of the gate pulse is equal to 16 times the period of the clock pulses. Such a converter may be termed a "counting" converter.

A counting converter of the general type described above is shown in U. S. Patent No. 2,272,070, entitled "Electric Signaling System" by A. H. Reeves, issued February 3, 1942; and an improvement in this type of conversion system is described and claimed in copending U. S. patent application Ser. No. 293,625, filed June 14, 1952, entitled "Analogue-to-Digital Converter System" by M. L. MacKnight.

In general the counting converter requires $2^N$ clock pulse intervals to convert an analogue input signal to an N-digit binary number; $2^N$ clock pulse intervals being the cycling time of the counter—where the counter includes N flip-flops, one for each binary digit desired. The $2^N$ pulse interval conversion period is required, whenever it is necessary to read the digital setting of the counter at a fixed time in a computing cycle, in order to allow for the conversion of a full-scale analogue input signal. Thus, while it is theoretically possible to obtain conversions immediately after the counter has completed its operation, as a practical matter, a full $2^N$ clock pulse interval is utilized for each conversion.

A second type of electronic converter known in the prior art may be referred to as a "digit-at-a-time" converter, since the analogue signal is converted to a set of digital signals, one binary digit at a time. One system of this general type is described in an article entitled "Telephony by pulse code modulation," by W. M. Goodall, in vol. XXVI of Bell System Technical Journal, January 1948, on pages 395–409.

In the system described in the article by W. M. Goodal, the amplitude of the analogue sample is compared with a standard voltage representing the magnitude of the highest order digit of the digital set. If the standard voltage is smaller than the sample, it is subtracted from the sample and the remainder is then compared with a standard voltage representing the next highest order digit. This process is continued until the lowest order or units digit is compared with the remainder of the sample and is determined to be either larger or smaller. Each time the standard voltage is found to be smaller than the sample, a binary 1 is recorded or transmitted; and each time the standard voltage is found to be larger than the sample, a binary 0 is recorded and the standard voltage is not subtracted from the sample.

In operation the digit-at-a-time converter requires only N clock pulse time intervals for each conversion and, consequently, has the advantage of speed over the counting type of converter. The particular type of digit-at-a-time converter described in the above-cited publication, however, is considerably more complicated than a counting type of converter, and is limited in accuracy due to the difficulty in obtaining separate voltages accurately representing the magnitudes of the binary digits; and due to the difficulty in accurately subtracting binary voltage increments from the analogue sample.

In a third type of input converter, hereinafter termed a "continuous" converter, the amplitude of the analogue signal to be sampled is continuously compared with a variable reference voltage representing the digital count in a counter. After each comparison, a signal is produced indicating the difference between the analogue potential and the reference voltage; the signal being then utilized to vary the count of a counter, and thereby the reference voltage, in single discrete steps until the magnitude of the reference voltage and the analogue signal are substantially equal. Once this condition is reached the counter continuously follows the variations of the analogue potential, and readings are available after extremely short time intervals. A continuous converter of this general type is described in U. S. Patent No. 2,539,623, entitled "Communication System," by R. A. Heising, issued January 30, 1951; and an improved type of continuous converter is described and claimed in a copending U. S. patent application, Ser. No. 272,784, entitled "Analog-to-Digital Converter," by Cameron B. Forrest and Sidney S. Green, filed February 21, 1952.

Whenever it is possible to sample the analogue signal continuously, it is apparent that the continuous type of converter provides a very high-speed conversion system. In addition, that section of the converter which provides a reference voltage representing the digital count in the counter may readily be used in an output converter, without the introduction of a substantial amount of additional circuits. The continuous type of converter, however, cannot operate at high speed in a system where it is necessary to convert a plurality of analogue signals to corresponding digital signal sets, and where there is no previous digital record of the conversion of the analogue signals. Since in its fastest operation the counter would be set at half scale and count up or down, depending upon whether or not the analogue signal was greater or less than the reference voltage, it is clear that the continuous converter requires at least $2^{N-1}$ clock pulse intervals for each conversion in a multiple analogue signal system.

Finally, a fourth type of analogue-to-digital converter measures the amplitude of the analogue sample and produces the corresponding digit pulses directly without intermediate counting or subtracting. This type of converter may be referred to as a "direct" converter, one such converter being shown in U. S. Patent No. 2,530,538, entitled "Vernier Pulse Code Communication System," by A. J. Rack, issued November 21, 1950. The converter described in the patent to Rack includes a cathode ray tube provided with deflecting elements for deflecting the beam, under control of an analogue signal sample to be coded, to a particular aperture row. The aperture rows are arranged in accordance with the digital code which is representative of the analogue signal sample. This type of converter provides the highest speed of operation but requires special structure such as cathode ray tubes and requires a considerable amount of amplifying, deflecting, and stabilizing circuits which are not otherwise required.

The present invention provides an electronic analogue-to-digital converter system for converting a plurality of analogue input signals to corresponding sets of digital output signals, without the requirement of a previous digitial record of the conversion of the analogue signals as is required in the continuous type of converter system. The converter of the present invention may be considered to be of the digit-at-a-time described above, in that one binary digit is formulated at a time; the entire conversion requiring N clock pulse intervals.

Conversion, according to the present invention, however, is not performed in the manner described in the above-cited article by W. M. Goodall, since separate standard voltages are not generated for each of the digits to be represented. According to the present invention the digital number stored in a register, having as many flip-flops therein as the number of binary digits desired is continuously converted into a corresponding reference signal. The reference signal is compared with the analogue input signal in a comparator which produces a signal indicating the sense of difference between the reference signal and the analogue input signal.

In one manner of operation the flip-flops of the register are initially set so that the highest place flip-flop registers 1 and all of the other flip-flops are in a 0-representing state. As a result, the reference signal assumes a magnitude corresponding to the highest order digit to be represented. The signal produced by the comparator then indicates whether or not the analogue input signal is larger than the reference signal. If the analogue input signal is larger than the reference signal, the highest place digit should be 1 and the setting of the highest place flip-flop of the register is not changed. If the sense of the comparator signal indicates that the analogue input signal is smaller than the reference signal the highest place digit is 0 and the highest place flip-flop is reset to 0. The lower place flip-flops are then turned on, one at a time, in descending order, each flip-flop being set in accordance with the sense of the difference resulting from the corresponding comparison.

The high speed characteristic of the present invention makes it practical to perform a great number of conversions on a time-sharing basis. Thus, in one embodiment which is described, a plurality of analogue signals to be converted are applied to the input circuit of the comparator through separate electronic input switches which may be operated at high speed without distorting the input signals.

The principal embodiment of the present invention comprises: a digital number register having N flip-flops, which are turned on one at a time during the conversion operation; a digital-to-analogue decoding circuit for continuously producing a reference signal corresponding to the digital information in the register; a comparator circuit, responsive to the reference signal and an applied analogue signal, for producing an output signal indicating the sense of the difference between the reference signal and the analogue signal; a plurality of electronic input switches for selectively applying analogue input signals to the input circuit of the comparator; and a control circuit for sequencing the conversion operation according to a predetermined time-sharing basis, and for controlling the turning on and off of the register flip-flops, in response to the comparator signal and to signals produced by the register flip flops.

Accordingly, it is an object of the present invention to provide an analogue-to-digital converter system which includes simple circuits for converting an analogue input signal into a corresponding set of digital signals, the conversion being performed by forming one digit-representing signal at a time.

Another object of the present invention is to provide an improved digit-at-a-time converter system wherein no special circuits are required for producing separate voltages representing binary digits and no special circuits are required for subtracting binary-weighted signals from the analogue input signal.

An additional object is to provide an analogue-to-digital converter system for converting a plurality of analogue input signals to corresponding sets of digital output signals, the conversion being performed without a previous digital record of the conversion of the analogue signals.

A further object is to provide an analogue-to-digital converter system wherein the conversion is performed by setting the stages of a digital number register, one at a time, under the control of a comparator circuit which produces an output signal corresponding to the difference between the analogue representation of the register setting and the analogue signal to be converted.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figure 1:
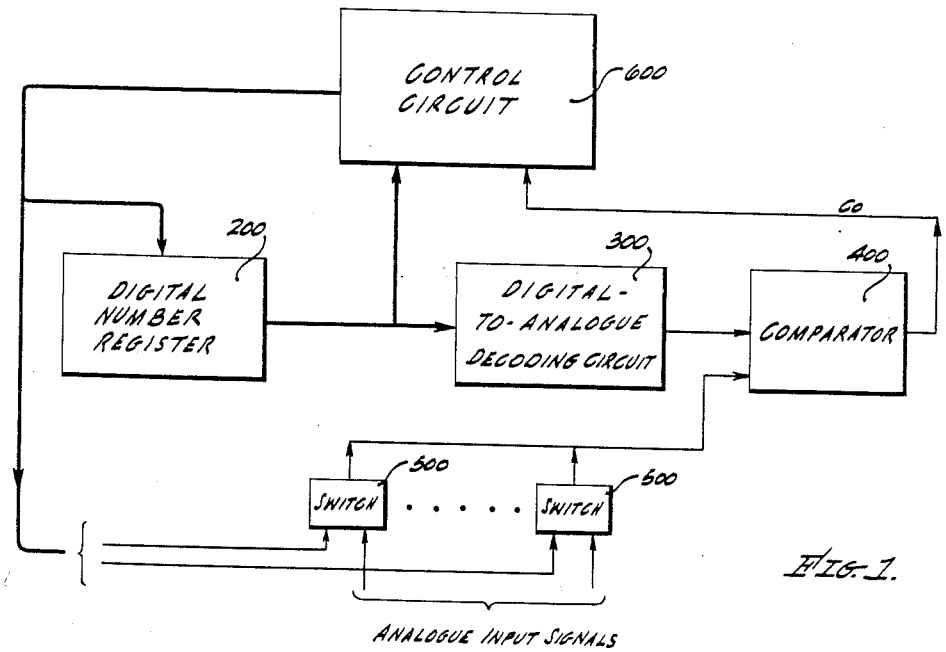
Fig. 1 is a block diagram of the basic embodiment of the present invention.

Referring now to Fig. 1, there is shown one embodiment of an analogue-to-digital converter system according to the present invention, wherein analogue input signals are converted to corresponding digital output signals, one digital signal being formed at a time. As shown in Fig. 1, the converter comprises: a digital number register 200, which is to be set to the digital number desired; a decoding circuit 300, connected to register 200, for continuously producing a reference signal corresponding to the digital setting of register 200; a comparator circuit 400, responsive to the reference signal and to an analogue input signal applied through one of separate input switches 500, for producing a signal Co indicating the sense of the difference between the reference signal and the analogue input signal; and a control circuit 600, responsive to signal Co, for producing signals to actuate register 200 so that it is set one digit at a time during the conversion. Control circuit 600 also produces timing signals for sequencing the switching in of analogue input signals.

Many of the circuits which are utilized in the embodiment shown in Fig. 1 are mechanized according to logical equations, these equations being determined through a logical consideration of the manner in which the conversion is to be performed. Consequently, the invention is more readily understood by first considering the manner in which the conversion is to be performed, then deriving the defining logical equations, and finally considering the details of specific circuits.

Figure 2:
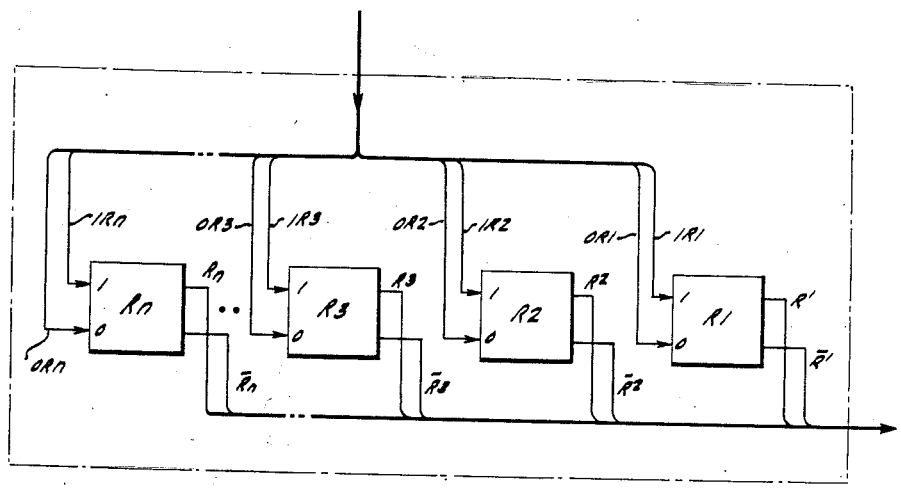
Fig. 2 is a block diagram of one form of the digital number register shown in Fig. 1.

In the analysis which follows it will be assumed that register 200 produces N pairs of complementary digital signals representing the N digits of the number desired, and designated as $R^1$, $\bar{R}^1$; $R^2$, $\bar{R}^2$; $R^3$, $\bar{R}^3$; ... and $R^n$, $\bar{R}^n$, respectively. One form of register suitable for providing the digital signals is illustrated in Fig. 2 wherein it is noted that register 300 includes $n$ flip-flops R1, R2, R3 ... and R$n$, producing complementary output signals $R^1$, $\bar{R}^1$; $R^2$, $\bar{R}^2$; $R^3$, $\bar{R}^3$; and $R^n$, $\bar{R}^n$; respectively, and having 1 and 0 input circuits designated as 1R1, 0R1; 1R2, 0R2; 1R3, 0R3; ... and 1R$n$, 0R$n$, respectively. The input circuits of each flip-flop are arranged so that separate application of signals to the 1 and 0 input circuits set the flip-flop to stable states representing binary 1 and 0, respectively; and simultaneous application of signals to both input circuits, triggers, or reverses the stable state of the flip-flop. The arbitrary convention will be adopted throughout the following description that the high and low levels of a digital signal will be designated as the 1 and 0 levels, respectively. An arbitrary convention will also be adopted relating the 1 and 0 levels of a signal to the 1 and 0 states of the flip-flop originating the signal. For the signal $R^n$, for example, the convention is adopted that signal Rn is at its 1 and 0 levels, respectively, when the originating bistable R$n$ is in its corresponding 1 and 0 states. Complementary signal $\bar{R}^n$, on the other hand, is at its 0 and 1 levels, respectively, when flip-flop R$n$ is in its corresponding 1 and 0 states, respectively. The same conventions relate each of the other signals to their originating bistable circuits.

It will be noted that the leads shown in Fig. 2 are designated by the signals appearing thereon, as illustrated by lead $R^n$ which receives output signal $R^n$ from flip-flop R$n$. This convention is followed throughout this specification so that the algebraic mechanization equations which are given below may be interpreted directly as the circuit connections which are shown in the figures. In addition, it will be noted that the leads coming from control circuit 600 are numbered according to the flip-flop input circuit to which they are connected. Thus, lead 1R3 is connected to input circuit 1R3 of flip-flop R3.

In preforming a digit-at-a-time conversion, the binary digits of the desired digital set are formed in descending order of place, starting with the most significant binary digit. There are two basic methods of operation for forming the binary digits in this manner. In a first method of operation the flip-flops of register 200 are initially set to 0 and are then set to 1, in descending order of place, one flip-flop being set to 1 at the beginning of each clock-pulse period. At the end of each clock-pulse period, then, the flip-flop which has just been set to 1 is reset to 0 if signal Co is 1, otherwise it remains in its 1 state.

According to the second basic method of operation, the flip-flops of register 200 are initially set to 1 and then are set to 0, in descending order of place. At the end of each clock pulse period, then, the flip-flop which has just been set to 0 at the beginning of the corresponding clock-pulse period is reset to 1 if signal Co is 0, otherwise it remains set to 0.

In either method of operation it is possible to eliminate one clock-pulse period of operation by initially setting flip-flop R$n$ to the state it is to assume during the first period of the conversion operation. Thus, in conversion according to the first method flip-flop R$n$ is initially set to 1 and flip-flops R1 through R$n$–1 are set to 0; and in conversion according to the second method flip-flop R$n$ is initially set to 0 and flip-flops R1 through R$n$–1 are set to 1.

When the converter is to be utilized in a computer system it is frequently necessary to synchronize its operation with the computer operation by utilizing the computer synchronizing pulses, hereinafter referred to as pulses Cp, to control the conversion operation. Thus, in one form, the converter of the present invention is controlled by voltage-level timing signals Ti and the computer synchronizing signals Cp. Although there are many other methods of timing, it will be assumed in the discussion which follows that voltage-level timing signals Ti and pulses Cp are utilized to sequence the conversion operation.

Since there are N clock-pulse periods of operation, $N+1$ timing signals are required for sequencing the operation; N timing signals being utilized to control the application of pulses Cp at the beginning of the clock-pulse periods, respectively, and the $(N+1)$st timing signal being utilized to control the application of a pulse Cp at the end of the conversion operation. N of the timing signals are designated as $Ti^1$ through $Ti^n$ and have levels representing binary 1 prior to the first through the Nth clock-pulse periods, respectively; and the $(N+1)$st timing signal is represented as $Ti^{n+1}$ and has a level representing binary 1 during the last clock-pulse period. In addition, it is convenient to define the timing signal $Ti^j$ as representing any of the timing signals $Ti^1$ through $Ti^n$.

Where the flip-flops of register 200 are utilized for other operations when it is not the analogue-to-digital conversion period it is necessary to prevent the application of signals to the flip-flops according to the conversion logic. One method of achieving this is through the utilization of a signal Ad, having a level representing 1 only during the analogue-to-digital conversion period, and a level representing 0 at all other times. The signal Ad, then, is utilized in the logical equations appearing below to limit the application of analogue-to-digital conversion signals to the proper period.

According to the first method of operation discussed above, then, flip-flop R$n$ is set to 1 at the beginning of the analogue-to-digital conversion period $(Ad=1)$ if signal $Ti^1$ is 1 and pulse Cp is applied to the converter. This relationship may be expressed algebraically as:

$$1Rn = Ad.Ti^1.Cp$$

where the dot (.) represents the logical "and." This function indicates that the pulse Cp is applied to the 1 input circuit of flip-flop R$n$ when signal Ad is 1 and signal $Ti^1$ is 1.

Conversions according to the first and second methods discussed above may then be defined, respectively, according to sets (1) and (2) of the following equations:

(1)

$1Rn = Ad.Ti^1.Cp$
$0Rn = Ad.Ti^2.Co.Cp$
.
.
.
$1Rj = Ad.Ti^x.Cp$
$0Rj = Ad.(Ti^{x+1}.Co + Ti^1).Cp$
.
.
.
$1R1 = Ad.Ti^n.Cp$
$0R1 = Ad.(Ti^{n+1}.Co + Ti^1).Cp$ (2)

$1Rn = Ad.Ti^2.\overline{Co}.Cp$
$0Rn = Ad.Ti^1.Cp$
.
.
.
$1Rj = Ad.(Ti^{x+1}.\overline{Co} + Ti^1).Cp$
$0Rj = Ad.Ti^x.Cp$
.
.
.
$1R1 = Ad.(Ti^{n+1}.\overline{Co} + Ti^1).Cp$
$0R1 = Ad.Ti^n.Cp$ In these equations $x$ is equal to: $n-j+1$, so that $Ti^x$ is a timing signal which controls the setting of 1 of flip-flop $Rj$. If $n$ is 8 and $j$ is 5, for example, $Ti^x$ becomes $Ti^4$, indicating that the fourth timing signal is utilized to turn on flip-flop $R5$. The plus sign (+) represents the logical "or," so that the function $Ti^{x+1}.Co + Ti^1$ has a value of 1 if $Ti^{x+1}.Co$ is 1 or if $Ti^1$ is 1.

In set (1) above it is noted that signal $Ti^1$ appears in function $1Rn$ and in functions $0R1$ through $0Rn-1$, $j$ representing any of the integers: 1 through $n-1$. Thus, flip-flop $Rn$ is initially set to 1 and flip-flops $R1$ through $Rn-1$ to 0. Similarly, in set (2), signal $Ti^1$ functions to set flip-flop $Rn$ to 0 and flip-flops $R1$ through $Rn-1$ to 1.

According to the equations of set (1), then, flip-flop $Rj$ is set to 1 after timing signal $Ti^x$ is 1 and a pulse $Cp$ is applied; and is then set to 0 after signal $Ti^{x+1}$ is 1, if signal $Co$ is 1 and pulse $Cp$ is applied. Thus, if $n$ is equal to 8, flip-flop $R2$ is set to 1 after timing signal $Ti^6$ is 1 and is then set to 0 after timing tignal $Ti^7$ is 1, if signal $Co$ is 1 and pulse $Cp$ is applied. In a similar manner, according to the equations of set (2), flip-flops $Rj$ are set to 0 after timing signal $Ti^x$ is 1 and are then set to 1 after signal $Ti^{x+1}$ is 1, if signal $\overline{Co}$ is 1.

The timing signals utilized in the above equations may be derived from a counter which counts the number of applied pulses $Cp$. While this arrangement may be satisfactory in a computer system which already includes a counter, in other cases it may require additional flip-flops which, it will be shown, are not necessary since the timing signals may be derived from the flip-flops of register 200. While the basic concept of the invention is not limited to a system wherein the timing signals are derived from the register, this arrangement is a novel feature of one of the species.

Since, according to the equations of set (1), each flip-flop $Rj$ (except $Rn$) is initially set to 0 and is set to 1 in descending order or place, it is apparent that when signal $T^x$ is 1 (setting $Rj$ to 1), the next higher place flip-flop $Rj+1$ has just been set to 1, and that the lower place place flip-flops $R1$ through $Rj$ are still set to 0. Thus, the timing signal $T^x$ may be defined as follows:

$$T^x = R^{j+1}.\overline{Rj} \ldots \overline{R^1}$$

indicating that $T^x$ is 1 after flip-flop $Rj+1$ is set to 1, but before any of the flip-flops $R1$ through $Rj$ have been set to 1. In a similar manner, timing signal $T^{x+1}$ becomes 1 after flip-flop $Rj$ is set to 1, but before flip-flops $R1$ through $Rj-1$ are set to 1. Thus, $T^{x+1}$ is defined as follows:

$$T^{x+1} = R^j.\overline{R^{j-1}} \ldots \overline{R^1}$$

From this analysis it should be apparent that timing signals $T^x$ and $T^{x+1}$, for the system defined by equations of set (2) may be defined in the following manner:

$$T^x = \overline{R^{j+1}}.R^j \ldots R^1$$

$$T^{x+1} = \overline{R^j}.R^{j-1} \ldots R^1$$

Since timing signal $Ti^1$ is utilized to control the initial setting of the flip-flops it is not derived from the flip-flops signals themselves but rather may be derived from an associated computer or, if the converter system is a separate unit, may be derived from an operator's start signal. After substituting in the timing signals $T^x$ and $T^{x+1}$ defined in terms of the register flip-flop signals sets (1) and (2) above then become:

(1)

$1Rn = Ad.Ti^1.Cp$
$0Rn = Ad.(R^n.\overline{R^{n-1}} \ldots \overline{R^1}).Co.Cp$
.
.
.
$1Rj = Ad.(R^{j+1}.\overline{R^j} \ldots \overline{R^1}).Cp$
$0Rj = Ad.(R^j.\overline{R^{j-1}} \ldots \overline{R^1}.Co + Ti^1).Cp$
.
.
.
$1R1 = Ad.(R^2.\overline{R^1}).Cp$
$0R1 = Ad.(R^1.Co + Ti^1).Cp$ (2)

$1Rn = Ad.(\overline{R^n}.R^{n-1} \ldots R^1.\overline{Co}).Cp$
$0Rn = Ad.Ti^1.Cp$
.
.
.
$1Rj = Ad.(\overline{R^j}.R^{j-1} \ldots R^1.\overline{Co} + Ti^1).Cp$
$0Rj = Ad.(\overline{R^{j+1}}.R^j \ldots R^1).Cp$
.
.
.
$1R1 = Ad.(\overline{R^1}.Co + Ti^1).Cp$
$0R1 = Ad.(\overline{R^2}.R^1).Cp$ It will be noted that the function $1Rj$ includes the signal $\overline{R^j}$, indicating that when flip-flop $Rj$ is 1 ($\overline{R^j}=0$) no signal is applied to the 1 input circuit thereof. It may be seen, then, that signal $\overline{R^j}$ is superfluous since if flip-flop $Rj$ is already in a 1-representing state it is permissible to allow the application of a signal to its 1 input circuit since this causes no change. Thus, signal $\overline{R^j}$ may be replaced with 1 in functions $1Rj$, above. In a similar manner, the signal $R^j$ is superfluous in the function $0Rj$ since it is permissible to apply a signal to the 0 input circuit of flip-flop $Rj$ if it is already set to 0 as indicated by $R^j$ being equal to 0. Substituting 1 for $\overline{R^j}$ in the functions $1Rj$ and 1 for $R^j$ in the functions $0Rj$, the equations of set (1) and (2) become:

(1)

$1Rn = Ad.Ti^1.Cp$
$0Rn = Ad.(\overline{R^{n-1}} \ldots \overline{R^1}.Co).Cp$
.
.
.
$1Rj = Ad.(R^{j+1}.\overline{R^{j-1}} \ldots \overline{R^1}).Cp$
$0Rj = Ad.(\overline{R^{j-1}} \ldots \overline{R^1}.Co + Ti^1).Cp$
.
.
.
$1R1 = Ad.R^2.Cp$
$0R1 = Ad.(Co + Ti^1).Cp$ (2)

$$1Rn = Ad.(R^{n-1} \ldots R^1.\overline{Co}).Cp$$
$$0Rn = Ad.Ti^1.Cp$$

.
.
.

$$1Rj = Ad.(R^{j-1} \ldots R^1.Co + Ti^1).Cp$$
$$0Rj = Ad.(\overline{R}^{j+1}.R^{j-1} \ldots R^1).Cp$$

.
.
.

$$1R1 = Ad.(Co + Ti^1).Cp$$
$$0R1 = Ad.\overline{R}^2.Cp$$

Figure 3A:
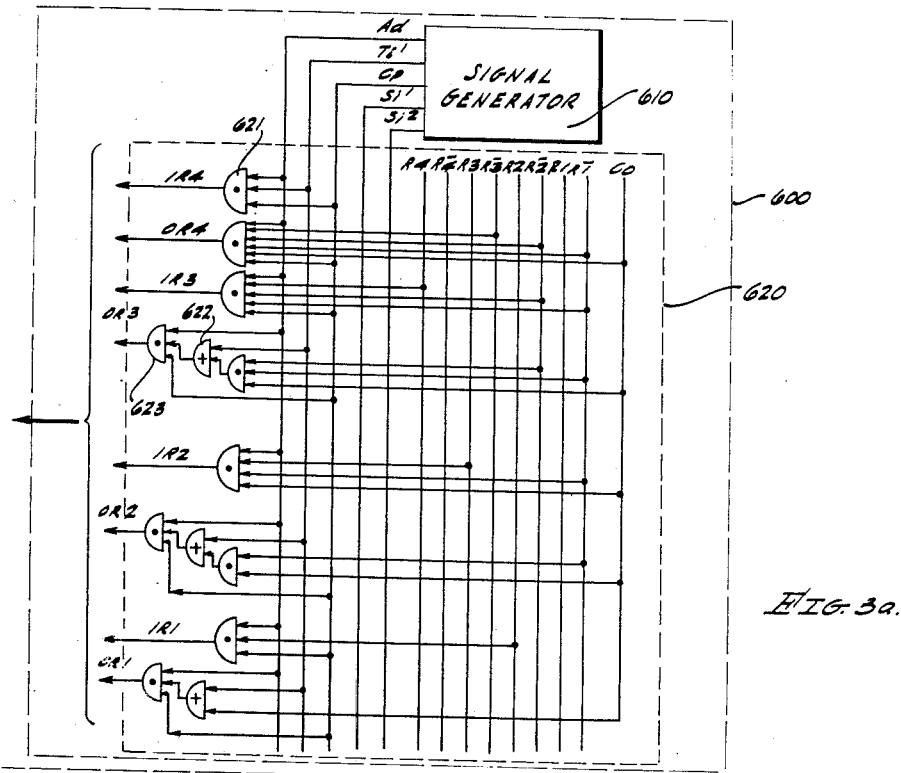
Fig. 3a is a schematic diagram of one form of the control circuit shown in Fig. 1.
Figure 6:
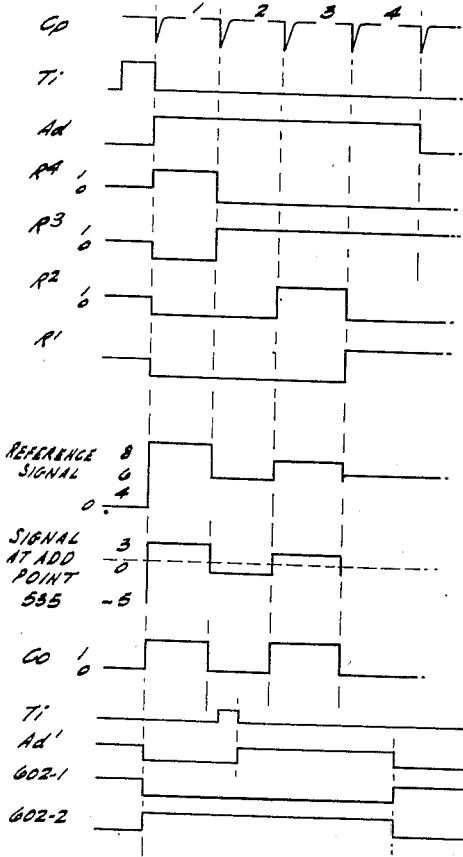
Fig. 6 is a composite diagram of the wave forms of signals appearing at various points in the embodiment of Fig. 1 during illustrative analogue-to-digital conversion.

The manner in which specific circuits are mechanized according to the defining algebraic functions given above is illustrated in Fig. 3a which shows one form of the control circuit 600 of Fig. 1. Referring now to Fig. 3a, it is noted that signals Ad, Ti¹ and Cp are produced by a signal generator 610. The waveforms of signals Cp, Ad and Ti¹ are illustrated in Fig. 6, where the other waveforms shown are those which occur during a particular input conversion operation which is described in detail below. Signal generator 610 is not shown in detail, since such circuits are well known in the art.

Control circuit 600 also includes a control matrix 620 which provides the input signals controlling the register flip-flops. It will be noted that for purposes of simplicity, input signals for only four flip-flops, R1, R2, R3, and R4, are shown in Fig. 3a, although any number of flip-flop input signals may be provided in the same manner. The defining algebraic equations for matrix 620 are:

$$1R4 = Ad.Ti^1.Cp$$
$$0R4 = Ad.\overline{R}^3.\overline{R}^2.\overline{R}^1.Co.Cp$$
$$1R3 = Ad.R^4.\overline{R}^2.\overline{R}^1.Cp$$
$$0R3 = Ad.(\overline{R}^2.\overline{R}^1.Co + Ti^1).Cp$$
$$1R2 = Ad.R^3.\overline{R}^1.Cp$$
$$0R2 = Ad(\overline{R}^1.Co + Ti^1).Cp$$
$$1R1 = Ad.R^2.Cp$$
$$0R1 = Ad.(Co + Ti^1).Cp$$

Each of the "and" functions in these equations is provided by an "and" circuit, such as "and" circuit 621, providing the signal $Ad.Ti^1.Cp$ which is applied to flip-flop input circuit 1R4. "And" circuit 621 responds to signals Ad, Ti¹ and Cp applied to separate input terminals and produces a signal $Ad.Ti^1.Cp = 1$, when signals Ad and Ti¹ are high-level signals representing binary 1 and a pulse Cp is applied. Each of the "or" functions is provided by an "or" circuit, such as "or" circuit 622 which provides a signal for input circuit 0R3. "Or" circuit 622 produces a 1-representing signal when either or both of signals $\overline{R}^2.\overline{R}^1.Co$ and Ti, applied to separate input terminals, are 1-representing signals. The signal $\overline{R}^2.\overline{R}^1.Co + Ti^1$ is combined with signals Ad and Cp in "and" circuit 623 which produces the signal $Ad.(\overline{R}^2.\overline{R}^1.Co + Ti^1).Cp$. The manner in which the other "and" and "or" circuits are mechanized, according to the corresponding equations, should be apparent from the examples already considered.

"And" and "or" circuits for providing the above-described operation are well known in the computer art; suitable circuits, for example, being shown on pages 37 to 45 of High-Speed Computing Devices by Engineering Research Associates, published in 1950 by McGraw-Hill Company, Inc., New York and London, and in an article entitled "Diode coincidence and mixing circuits in digital computers" by Tung Chang Chen in vol. 38 of the Proceedings of the Institute of Radio Engineers, May 1950, on pages 511 through 514.

Where register 200 includes a large number of flip-flops and the timing signals are derived from the flip-flops, in the above-described manner, the lower place flip-flops may be rather heavily loaded. Thus, with eight flip-flops (n=8), signal $\overline{R}^1$ appears in seven timing signals—placing a heavy load on flip-flop R1. This situation may be avoided by storing part of the timing function in an additional flip-flop which functions as a buffer between the lower-place register flip-flops and the load. Where eight flip-flops are utilized, for example, the function $Ad.\overline{R}^4.\overline{R}^3.\overline{R}^2.\overline{R}^1$, may be stored in a buffer flip-flop, hereinafter referred to as flip-flop Ad1, in the manner indicated by the following equations:

$$1Ad1 = Ad.Cp.$$
$$0Ad1 = Ad.R^5.Cp$$

According to these equations flip-flop Ad1 is set to 1 after Ad is 1 and pulse Cp is applied, and is set to 0 during the conversion (Ad=1), after signal R⁵ is 1, or just prior to R⁴ is set to 1. Thus, the signal Ad¹ produced by flip-flop Ad1 may be defined as follows:

$$Ad^1 = Ad.\overline{R}^4.\overline{R}^3.\overline{R}^2.\overline{R}^1$$

since signal Ad¹ is 1 during the period that Ad is 1, except that it becomes 0 after R⁵ is 1 and remains 0 during the period that any of signals R⁴, R³, R² or R¹ are 1.

Figure 3B:
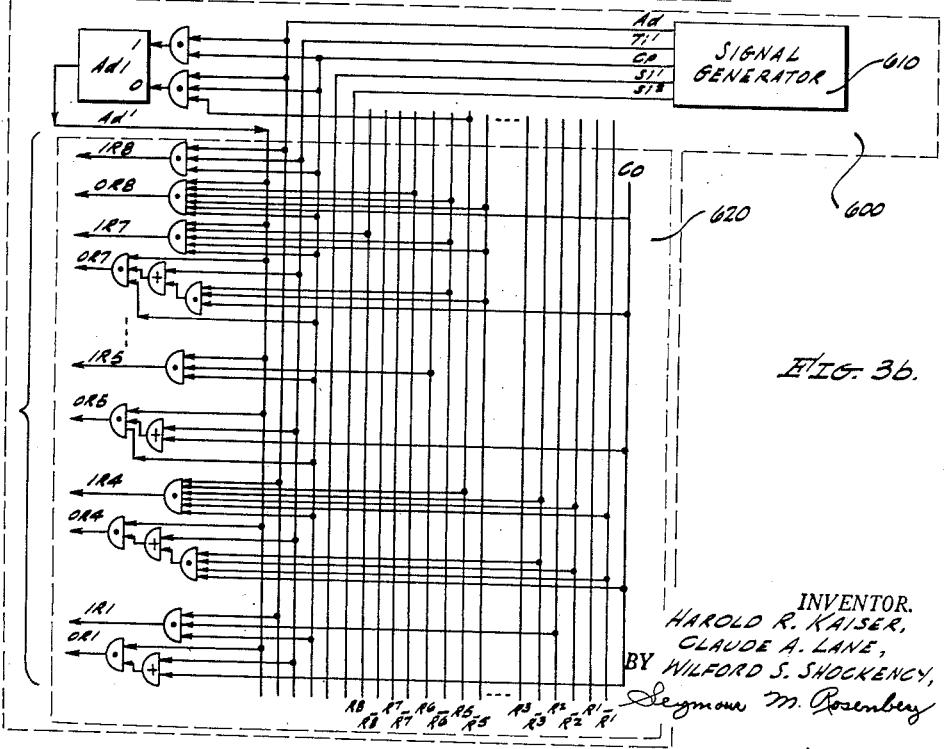
Fig. 3b is a schematic diagram of another form of the control circuit shown in Fig. 1.

One form of control circuit for a system including eight flip-flops and a buffer flip-flop Ad1, is illustrated in Fig. 3b and is mechanized according to the following equations:

$$1R8 = Ad.Ti^1.Cp$$
$$0R8 = Ad^1.\overline{R}^7.\overline{R}^6.\overline{R}^5.Co.Cp$$
$$1R7 = Ad^1.R^8.\overline{R}^6.\overline{R}^5.Cp$$
$$0R7 = Ad^1(\overline{R}^6.\overline{R}^5.Co + Ti^1).Cp$$

.
.

$$1R5 = Ad^1.R^6.Cp$$
$$0R5 = Ad^1.(Co + Ti^1).Cp$$
$$1R4 = Ad.R^5.\overline{R}^3.\overline{R}^2.\overline{R}^1.Cp$$
$$0R4 = Ad.(\overline{R}^3.\overline{R}^2.\overline{R}^1.Co + Ti^1).Cp$$

.
.

$$1R1 = Ad.R^2.Cp$$
$$0R1 = Ad.(Co + Ti^1).Cp$$
$$1Ad1 = Ad.Cp$$
$$0Ad1 = Ad.R^5.Cp$$

The manner in which matrix 620 is mechanized according to these equations should be apparent from the examples already considered and therefore will not be considered further.

Figure 4:
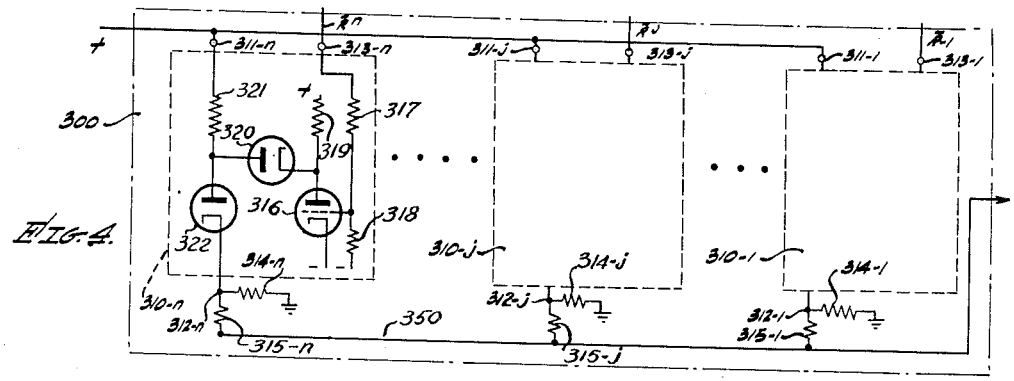
Fig. 4 is a schematic diagram of one form of the digital-to-analogue decoding circuit shown in Fig. 1.

During the time that the flip-flops of register 200 are being turned on or off under the control of signals produced by control circuit 600, decoding circuit 300 continuously produces an output signal indicating the setting of register 200. Decoding circuit 300 may be any of the well-known types of circuits for providing an analogue signal representation of a digital number. A suitable decoding circuit for example, is described and claimed in copending U. S. patent application, Serial No. 239,077, entitled "Digital-to-Analog Converter" by Siegfried Hansen, filed July 28, 1951, now Patent No. 2,718,634, issued September 20, 1955. It is preferred, however to use a decoding circuit of the type shown in Fig. 4 of this specification. The description in this specification concerning the decoding circuit of Fig. 4 is brief, since the circuit is described in greater detail in copending U. S. patent application, Serial No. 346,393, filed April 2, 1953, entitled "High-Speed Electronic Digital-to-Analogue Converter System," by C. A. Lane, W. S. Shockency and H. R. Kaiser, wherein another species of this type of decoding circuit is also described. This is now Patent No. 2,736,889, dated February 28, 1956.

As shown in Fig. 4, decoding circuit 300 comprises a plurality of current switches 310; n switches being shown.

corresponding to the $n$ flip-flops in register 200 respectively. Each of the current switches 310–$j$ ($j$ being any of the integers 1 through $n$) has an input terminal 311–$j$, an output terminal 312–$j$, and a control terminal 313–$j$. A source of positive potential, not shown, is applied to input terminal 311–$j$ and output terminal 312–$j$ is coupled to ground through a first current-weighting resistor 314–$\overline{R}j$. Signal $\overline{R}^j$, produced by flip-flop R$j$, is applied to control terminal 313–$j$ and is effective to control the switch in a manner to be described. Output terminal 312–$j$ is also coupled through a second current-weighting resistor 315–$j$ to common output line 350, which is connected to the input circuit of comparator 400, described in detail below.

Each of current switches 310–$j$ is "open" when the signal $\overline{R}^j$ applied to control terminal 313–$j$ is at a high level, indicating that the corresponding flip-flop registers a 0, and is "closed" when signal $\overline{R}^j$ is at a low level, indicating that the corresponding flip-flop registers a 1. When $\overline{R}^j=1$, and current switch 310–$j$ is open, no current passes through either of current-weighting resistor 314–$j$ or 315–$j$; whereas when signal $\overline{R}^j=0$, current switch 310–$j$ is closed and current flows through resistors 314–$j$ and 315–$j$.

Resistors 314–$j$ and 315–$j$ are selected so that when the input conversion is completed the current through resistor 315–$j$ has a value corresponding to the binary weight of the digit stored in flip-flop R$j$. As will be more fully understood when comparator 400 is considered in detail, the voltage on output line 350 is 0 volts at the end of the input conversion period and consequently the values of resistors 314–$j$ and 315–$j$ are readily computed on the basis of a given source voltage and current switch impedance. Complete details as to circuit values and potentials are given in the above-mentioned copending application for "High-Speed Electronic Digital-to-Analogue Converter System."

In one form, each of current switches may be of the type illustrated for current switch 310–$n$. As shown in Figure 4, current switch 310–$n$ comprises a triode 316 having its control grid connected through a resistor 317 to control terminal 313–$n$ and connected through a resistor 318 to a source of negative biasing potential, not shown. The biasing potential is selected so that with signal $\overline{R}^n$ in its high-level state representing binary 1 triode 316 conducts, and with signal $\overline{R}^n$ in its low-level state triode 316 is cut off.

The anode of triode 316 is coupled through a load resistor 319 to a source of positive potential, not shown, and to the cathode of a diode 320. The anode of diode 320 is coupled through a resistor 321 to input terminal 311–$n$. The cathode of triode 316 is connected to a source of negative potential, not shown, which is selected so that conduction of triode 316 lowers the potential appearing at the anode of diode 320 to a negative value. The anode of diode 320 is also connected to the anode of a second diode 322 which has its cathode connected to output terminal 312–$n$.

In operation, whenever signal $\overline{R}^n$ is high and triode 316 is conducting the potential appearing at the anode of diodes 320 and 322 is sufficiently negative to bias diode 322 so that no current may pass there through. Thus, the current switch is "open" when signal $\overline{R}^n$ represents binary 1, and flip-flop R$n$ registers 0.

When signal $\overline{R}^j$ is at a low level indicating that flip-flop R$n$ registers a 1, triode 316 is cut off, with the result that the anode potential thereof rises to a level which is high enough to bias off diode 320. As a result, diode 322 is no longer biased off and conducts, allowing a binary-weighted current to flow through register 315–$n$, which constitutes closure of the switch.

Figure 5:
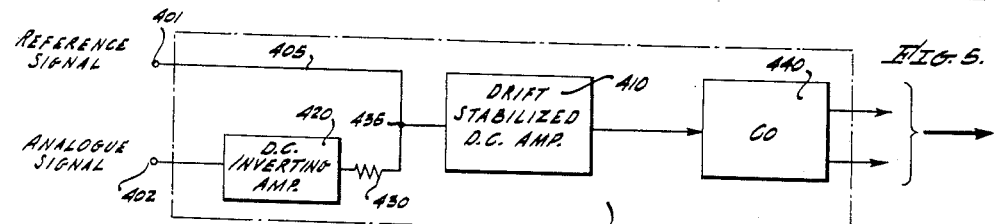
Fig. 5 is a schematic diagram of one form of the comparator shown in Fig. 1.

Since a binary-weighted current passes through each current switch 310–$j$ when it is closed under the control of the associated flip-flop signal $\overline{R}^j=0$, it is apparent that the total current passing through all of the current-weighting resistors 315 corresponds to the binary setting of register 200. The currents passing through resistors 315 are added in output lead 350 which is connected to the input circuit of comparator 400, one embodiment of which is shown in Fig. 5. It should be apparent now that the current signal which is present in lead 350 is the reference signal above referred to.

Consider now the manner in which comparator 400, shown in Fig. 5, produces signals $Co$ and $\overline{Co}$ as a function of the sense of the difference between the reference signal and an applied analogue input signal. Referring now to Fig. 5, it is noted that the reference signal and the analogue signal to be converted are applied to first and second input terminals 401 and 402 of comparator circuit 400. Input terminal 401 is connected via lead 405 to the input circuit of a drift-stabilized D. C. amplifier circuit 410, and input terminal 402 is connected to the input circuit of D. C. inverting amplifier 420, amplifier 420 being also drift stabilized and producing an amplified output signal which corresponds to the applied analogue input signal but having an opposite polarity or sign. The output circuit of amplifier 420 is coupled through an adding resistor 430 to lead 405, the junction 435 created thereby being hereinafter referred to as an add point.

Amplifier 410 produces a signal which corresponds to the difference between the reference signal and the analogue signal, the difference signal being then applied to the input circuit of a D. C. trigger circuit 440. Trigger circuit 440 has first and second output circuits producing signals $Co$ and $\overline{Co}$, respectively. Signals $Co$ and $\overline{Co}$ have levels representing binary 1 and 0, when the sense of the difference between the reference signal and the applied analogue input signal is positive, and have levels representing binary 0 and 1 when the sense of the difference is negative.

D. C. amplifier circuits suitable for use in comparator 400 are well known in the art; illustrative types of circuits, for example, being shown and described in an article entitled "Driftless D. C. amplifier" by Frank R. Bradley et al. in vol. 25 of Electronics, April 1952, on pages 144 through 148. Similarly, D. C. trigger circuits of the type required for trigger circuit 440 are well known, a suitable circuit, for example, being known as a Schmitt trigger circuit. Such a circuit is described in an article entitled "A thermionic trigger" by O. H. Schmitt in volume XV of Journal of Scientific Instruments, 1938, on pages 24 through 26.

Adding resistor 430 in comparator circuit 400 is selected so that with the analogue input signal at its full-scale value and register 200 set so that all flip-flops are in a 1-representing condition, the current therethrough is sufficient to cause the potential of add point 435 to stabilize at substantially zero volts. Thus, if a full-scale analogue signal causes the output voltage of amplifier 420 to fall to a potential of −50 volts, and if the sum of all currents through resistors 315 in decoding circuit 300 is 2 milliamperes, then adding resistor 430 is 25,000 ohms.

With a linear variation of the output voltage of amplifier 420 in response to changes in the analogue input signal, it is apparent that the add point potential will stabilize at substantially zero volts whenever the setting of register 200 represents the digital equivalent of the analogue input signal. The potential at the add point, however, may differ from zero by an amount which is equivalent to the analogue representation of the least significant binary digit, without reducing the accuracy of the system.

It should be understood, then, that with a decoding circuit of the type shown in Fig. 4, the potential appearing at add point 435 is positive, when the setting of register 200 represents an analogue signal greater than the analogue input signal, and that the add point potential is negative, when the setting of register 200 represents an analogue signal which is less than the analogue input signal. As is more fully explained in the above-mentioned copending application entitled, "High-Speed Electronic Digital-to-Analogue Converter System", however, the decoding circuit 300 may produce negative currents corresponding to the setting of register 200 and, when this type of decoding circuit is utilized, the voltage at add point 435 is inverted with respect to that just described. In the discussion that follows, however, it will be assumed that positive and negative potentials appearing at add point 435 indicate that the reference signal is greater and less than the analogue input signal, respectively.

The accuracy of the conversion system is a function of the number of binary digits which may be correctly produced. If N binary digits are correct then it may be said that the system is capable of reproducing the analogue input signal as a binary number to within an error range of $\frac{1}{2}^{N+1}$ times the full-scale analogue signal. This may also be referred to as an N-digit accuracy, where N−1 digits of the binary result are assumed to be correct, and the least significant digit is correct to within one-half a digit.

The most critical test of the converter system is as to whether the comparator circuit can accurately sense a difference signal corresponding to one-half of the least significant binary digit. This sensitivity cannot be achieved if the comparator is biased at zero volts since the analogue input signal may be just slightly less than a binary number having a 1 in the least significant place and, when flip-flop R1 is turned on (according to method (1)) trigger 440 is set to 1 and flip-flop R1 is set to 0. This operation thus produces an error which is greater than one-half of the least significant digit.

It is apparent, then, that to maintain the N-digit accuracy trigger 440 must be biased so that it is not set to 1 unless the difference signal applied thereto is greater than one-half of the least significant digit. Where a positive-signal decoding circuit is utilized trigger circuit 440 is biased negatively by an amount corresponding to one-half of the least significant digit so that it triggers when the applied signal is positive by the corresponding amount; and, similarly, where a negative-signal decoding circuit is utilized trigger circuit 440 is biased positively by an amount corresponding to one-half of the least significant digit.

Considering now an illustrative operation of the input conversion circuits of Fig. 1, reference being also made to Fig. 6 wherein certain waveforms occurring during this operation are shown. For simplicity it is assumed that the analogue input signal is to be converted to a four digit binary number and, consequently, register 200 includes only four flip-flops R1, R2, R3 and R4, the output signals of these flip-flops being represented, in Fig. 6, by waveforms R¹, R², R³ and R⁴, respectively.

In the particular operation which is to be illustrated the analogue input signal is assumed to be a 5-unit signal, where each unit is the analogue equivalent of the least significant binary digit in the digital number desired.

As shown in Fig. 6, flip-flop R4 is set to 1 and flip-flop R1 through R3 to 0 at the occurrence of the first clock pulse signal Cp after signal Ti¹ assumes a 1-representing level. It will be noted that prior to the start of the input-conversion operation signals R¹, R², R³, and R⁴ are shown as having levels intermediate to 1 and 0 in order to indicate that may be in either state depending upon how they are left after the end of the preceding operation. It should be understood, however, that there is actually no intermediate level.

As flip-flop R⁴ is set to 1 the reference signal produced by decoding circuit 300 assumes an 8-unit level corresponding to the analogue representation of the most significant binary digit. Since the analogue input signal is only a 5-unit signal, the difference signal at add point 535 is approximately a positive 3-unit signal (approximate since the reference signal does not accurately represent the register setting until the add point potential is 0 volts). The positive potential at add point 435 causes trigger circuit 440 to register binary 1 and consequently the comparator output signal Co assumes a level of 1.

At the end of the first clock pulse period of operation, flip-flop R4 is set to 0 in response to the application of the second clock pulse signal to the gate which provides a signal for input circuit 0R4, since signal Co is 1 while flip-flop R3 is set to 1 in response to the application of the same second clock pulse signal to the gate which provides an input signal for input circuit 1R3. Because the R4 flip-flop requires a finite time to change state, the R4 signal is, of course, still being fed to the 1R3 gate at the time the second clock pulse is applied to the 1R3 gate. Signal Co then becomes 0 since the add point potential becomes negative, representing the difference between an analogue input signal of 5 units and the 4-unit weight of flip-flop R3.

Flip-flop R3 is not turned to 0 at the end of the corresponding clock-pulse period since at this time signal Co is 0 and a pulse is not applied to input circuit 0R3. Flip-flop R3, then, remains set at 1, indicating that third digit of the binary conversion is 1.

Flip-flop R2 is turned on at the beginning of the third clock-pulse period of the input conversion and is turned off at the end thereof, since the add point signal goes positive and signal Co becomes 1. Finally, during the fourth period of the input conversion, the add point potential is substantially 0 volts and trigger 440 remains set in a 0-representing stable state. Thus, flip-flop R1 is set to 1, but is not set to 0 at the end of the fourth clock-pulse period. At the end of the input conversion, then, it is apparent that register 200 is set so that it represents the binary number 0101, which corresponds to the 5-unit analogue input signal. It will also be noted that signal Co, produced during the input conversion, is the complement of the setting of register 200 so that signal $\overline{Co}$ may be utilized to provide a serial signal corresponding to the conversion of an applied analogue input signal.

Where a plurality of analogue input signals are to be converted to corresponding sets of digital signals, each analogue signal is coupled to the input circuit of comparator 400 through a separate input switch 500; input switches 500 being opened and closed under the control of signals produced by control circuit 600. One type of circuit suitable for use in input switches 500 is illustrated in Fig. 7.

Figure 7:
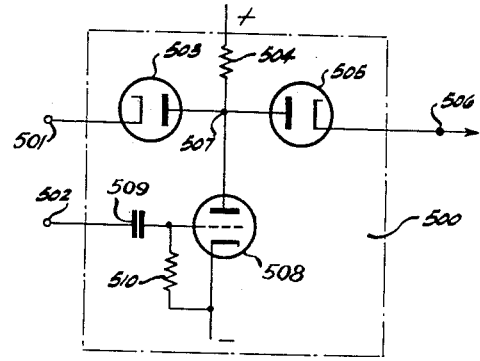
Fig. 7 is a schematic diagram of one form of the input switch shown in Fig. 1.

Referring now to Fig. 7, it is noted that input switch 500 includes first and second input terminals 501 and 502; the analogue signal to be converted and a control signal produced by control circuit 600 being applied to input terminals 501 and 502, respectively. Input terminal 501 is connected to cathode of a first diode 503 having its anode coupled through a load resistor 504 to a source of positive potential, not shown, the potential applied to resistor 504 being greater than the full-scale level of the analogue input signal. The anode of diode 503 is also connected to the anode of the second diode 505 which has its cathode connected to an output terminal 506; output terminal 506 being connected to the input circuit of comparator 400. The junction 507 of diode 503 and 505 is connected to the anode of a triode 508 having its grid coupled through coupling capacitor 509 to input terminal 502, the grid of triode 508 being also coupled through a load resistor 510 to its cathode. The cathode of triode 508 is connected to a source of negative potential, not shown.

In operation, triode 508 is normally conducting so that junction 507 is held at a negative potential which biases diode 503 and 505 so that they are nonconducting and, in effect, switch 507 is "open." When a negative signal is applied to input terminal 502, triode 508 is cut off, diode 503 becomes forward biased, and junction 507 rises to a value which is substantially equal to the value of the analogue signal applied to input terminal 501, since the potential drop across diode 503 is negligible. The signal appearing at junction 507 then is transmitted through diode 505, with substantially no distortion, to the input circuit of comparator 400.

When a plurality of input switches of the type described above are utilized, a short period is allowed prior to each input conversion to insure that the output signal of the corresponding switch rises to the level of the associated analogue input signal. The rise of the switch output signal may, for example, be delayed due to shunt capacity across the parallel-connected switches. A set of typical waveforms illustrating the operation of a pair of input switches, during two input conversions is shown in Fig. 6, the pair of input switches comprising a first input switch and a second input switch, each switch being identical to switch 500.

Waveforms Ti' and Ad', shown in Fig. 6, correspond to signals Ti and Ad discussed above except that they are periodic. Waveforms 602-1 and 602-2 represent the signals applied to input terminals 502 of the first and second switches, respectively. It will be noted that waveform 602-1 becomes negative, closing the first switch, a short interval prior to the first high-level portion of signal Ad', and waveform 602-2 becomes negative closing the second switch a short interval prior to the second high-level portion of signal Ad'; each of signals 602-1 and 602-2 then remaining negative throughout the corresponding input conversion period.

The input converter circuits of the data conversion system operate in the same manner where a plurality of analogue signals are to be converted as where only one signal is converted. Thus, it is not deemed necessary to reconsider the input conversion operation which has been discussed in detail above.

From the foregoing description it is apparent that the present invention provides an improved digit-at-a-time converter system which includes simple circuits for converting an analogue input signal into a corresponding set of digital signals, no special circuits being required for subtracting binary-weighted signals from the analogue input signal. It should also be evident that the invention provides a high-speed electronic system for performing conversions without a previous digital record of prior conversions as is required for a continuous type of converter; and that the conversion may be completed in N clock pulse intervals, where N is the number of digits in the binary number desired. As a result, the system of the present invention makes it possible to convert a considerable number of analogue signals to corresponding digital signals with simple circuits utilized on a time-sharing basis.

For simplicity the invention has been described with particularity with respect to an embodiment wherein conversions are made to 4-digit binary numbers. It should be understood, however, that the principles described herein are applicable to systems adapted to convert to binary numbers of other digit lengths. In a similar manner, it should be apparent that the number of input conversions which the system has been described as handling has been selected for illustration purposes only.

Specific forms of circuits suitable for decoding circuit 300, comparator circuit 400, and input switches 500, have been described in detail; and other forms of suitable circuits have incorporated by reference to relevant publications. It should be understood, however, that the basic concept of the invention is not limited to the specific circuits considered.

In a similar manner it is apparent that the circuits of control circuit 600 which are defined by the algebraic equations considered above may be replaced by others which are defined by a different set of equations. It has been pointed out, for example, that the equations defining the connections for matrix 620 shown in Fig. 3a and in Fig. 3b, may be replaced with equations which define an imput conversion wherein the flip-flops of register 200 are turned on one at a time under the control of signals produced by a timing counter.

Thus, it will be apparent to one skilled in the art that there are many analogue-to-digital conversion systems which may be designed according to the present invention without departing from the spirit thereof.

What is claimed as new is:

1. A high-speed electronic analogue-to-digital converter for converting an analogue input signal to a corresponding set of digital output signals, said system comprising: a digital number register including a plurality of flip-flops, one for each digit of the digital signal set, said flip-flops being operable to produce signals corresponding to said digits, respectively; a decoding circuit coupled to said register for continuously producing an analogue reference signal corresponding to the digital information in said register; a comparator circuit coupled to said decoding circuit and being responsive to said reference signal and to the analogue input signal for producing complementary signals $\overline{Co}$ and $Co$, respectively indicating the positive and negative sense of the difference between the analogue signal and the reference signal; a control circuit coupled to said comparator circuit and to said register for setting said flip-flops, one at a time in descending order of place, to stable states representing the digital equivalent of the analogue input signal, said control circuit including first means for initially setting said flip-flips to one stable state, second means for sequentially setting said flip-flops to the other stable state, and third means coupled to said comparison unit and operable in response to one of said complementary signals for resetting said flip-flops to said one state after said flip-flops are set to said other state, respectively.

2. The system defined in claim 1 wherein said one stable is the 0-representing stable state of said flip-flops, said other stable state is the 1-representing state of said flip-flops, and said one complementary signal is signal $Co$.

3. An electronic converter for forming a set of N digital signals coresponding to an analogue input signal, one digital signal of said set being formed at a time in descending order of place, said converter comprising: a register including N flip-flops operable to produce N signals corresponding to said digital signals, respectively; first means coupled to said register for continuously producing a reference signal having a level corresponding to the setting of said register; second means coupled to said first means and responsive to said reference signal and to the analogue input signal for producing comparator signals $Co$ and $\overline{Co}$ when said reference signal is greater and less than said analogue signal, respectively; and third means coupled to said register and said second means for applying the analogue input signal to said second means, said third means including apparatus for initially setting said flip-flops to one stable state, and for then sequentially setting said flip-flops in descending order to place to the other stable state, said apparatus being actuable in response to one of said comparator signals for resetting said flip-flops to said one stable state after said flip-flops are set to said other state, respectively.

4. The converter defined in claim 3 wherein each of said flip-flops includes a 1 and a 0 input circuit and produces complementary output signals; and wherein said third means includes a plurality of "and" and "or" circuits mechanized according to a predetermined set of logical equations, one for each of said input circuits, said equations including varables representing said complementary output signals, respectively, and defining the circuit connections to said input circuits, the equations defining the 1-input circuit connections determining the setting of the associated flip-flop to 1 and the equations defining the 0-input circuit connections determining the setting of the associated flip-flop to 0.

5. The converter defined in claim 3 wherein said second means includes a direct-current trigger circuit for producing signals $Co$ and $\overline{Co}$ having levels representing binary 1 and 0 when said trigger circuit is in a 1-representing stable state and having levels representing binary 0 and 1 when said trigger circuit is in a 0-representing stable state; said trigger circuit being set to 1-representing and 0-representing states, respectively, when the sense of the difference between said reference signal and said analogue signal is positive and negative; and said third means being actuated in response to said 1-representing level of signal $Co$ to reset said bistable devices to said one stable state.

6. A high-speed electronic conversion system for converting an analogue input signal to a corresponding set of digital signals, said system comprising: a plurality of bistable devices, one for each digital signal of said set, said devices having two stable states and being operable to produce signals corresponding to said digital signals, respectively; a decoding circuit coupled to said devices for continuously producing a reference signal having a level corresponding to the digital setting of said devices; a comparator coupled to said decoding circuit and responsive to said reference signal and to the analogue input signal for producing a two-level signal indicating the sense of the difference between the analogue signal and the reference signal, said two-level signal having first and second levels when said reference signal is greater and less than said analogue signal, respectively; and a control circuit coupled to said bistable devices and to said comparator for setting said bistable devices, one at a time in descending order of place, to a set of stable states representing the digital equivalent of the analogue input signal, said control circuit including first means for initially setting said bistable devices to one of said states, second means for then setting said bistable devices in sequentially descending order to the other of said states, and third means, actuated in response to said first level of said two-level signal, for resetting each individual bistable device of said plurality of bistable devices to said one state, respectively, after the corresponding bistable device has been set to said other state.

7. The system defined in claim 6 wherein said one and other stable states are the 0 and 1 representing stable states, respectively, of said flip-flops, and said first means includes a plurality of "and" and "or" circuits mechanized according to a predetermined set of logical equations defining an analogue-to-digital conversion wherein said flip-flops are initially set to 0-representing stable states, and are then set to 1-representing stable states in descending sequence, the flip-flops being reset to 0-representing stable states in response to signal $Co$.

8. A high-speed electronic digit-at-a-time converter for translating an analogue input signal to a corresponding set of N digital output signals, said converter comprising: a digital number register including flip-flops $R1 \ldots Rj, \ldots$ and $Rn$. $j$ representing any of the integers 1 through $n$, each of said flip-flops $Rj$ being operable for producing signals $Rj$ and $\overline{Rj}$ corresponding to the $j$th digit of said set; a decoding circuit coupled to said register for continuously producing an analogue reference signal corresponding to a digital number in said register; a comparator circuit coupled to said decoding circuit and responsive to said reference signal and to the analogue input signal for producing a signal $Co$ having 1 and 0 representing levels respectively indicating the positive and negative sense of the difference between said reference signal and the analogue input signal; a control circuit coupled to said register and said comparator circuit and being responsive to said flip-flop signals and to signals $Co$ for setting said flip-flops, one at a time in descending order of place, to stable states representing the digital equivalent of the analogue input signal, said control circuit including first means for initially setting said flip-flops to 1-representing states, second means for sequentially setting said flip-flops to 0-representing stable states, and third means operable in response to the 1-representing level of signal $Co$ for resetting said flip-flops to 0-representing states after said flip-flops are set to 1-representing states, respectively.

9. An electronic converter for forming a different set of N digital output signals corresponding to each of a plurality of analogue input signals, one digital signal of each output set being formed at a time in descending order of place, said converter comprising: a register including N flip-flops and producing N signals corresponding to said digital signals, respectively; decoding means coupled to said register for continuously producing a reference signal having a level corresponding to the setting of said register; comparator circuit means coupled to said decoding means and responsive to said reference signal and to an applied analogue signal for producing comparator signals $Co$ and $\overline{Co}$ when said reference signal is greater and less than the applied analogue signal, respectively; circuit means for electrically applying the analogue input signals to said comparator means, one analogue signal being applied during the formation of each corresponding set of digital signals; control circuit means coupling said register and said comparator circuit means, and operable during the formation of the sets of N digital output signals, for initially setting said flip-flops to one stable state, and then setting said flip-flops in descending sequence to the other stable state, said control circuit means being actuable in response to one of said comparator signals for resetting said flip-flops to said one stable state after said flip-flops are set to said other state, respectively.

References Cited in the file of this patent
UNITED STATES PATENTS

| | | |
|---|---|---|
| 2,521,733 | Lesti | Sept. 12, 1950 |
| 2,537,427 | Seid | Jan. 9, 1951 |
| 2,539,623 | Heising | Jan. 30, 1951 |
| 2,568,724 | Earp | Sept. 25, 1951 |
| 2,616,965 | Hoeppner | Nov. 4, 1952 |